Aug. 16, 1927.
E. P. LORCH
1,639,460
GEAR SHIFT MECHANISM
Filed Oct. 19, 1926
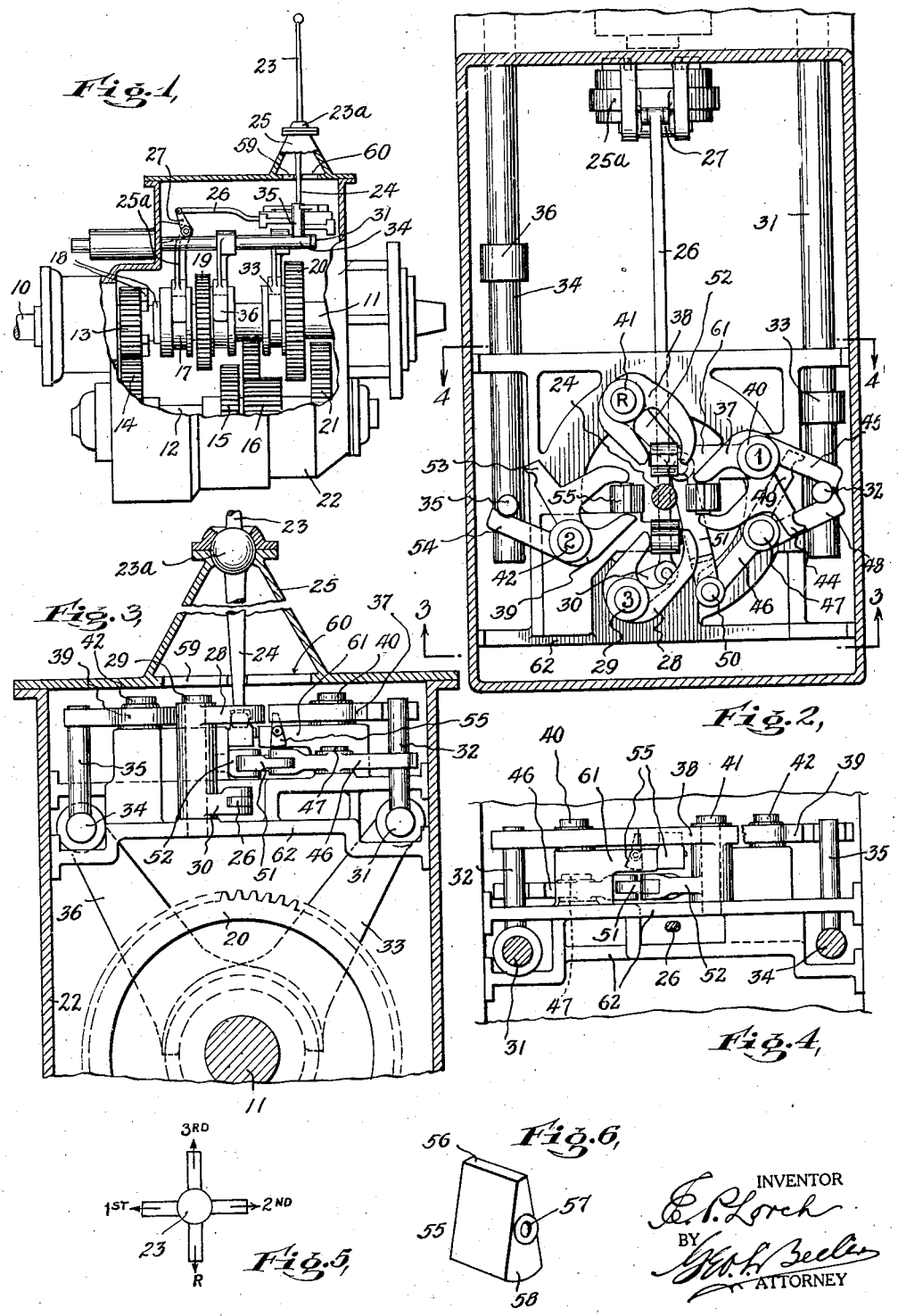

Patented Aug. 16, 1927.

1,639,460

UNITED STATES PATENT OFFICE.

ERNEST P. LORCH, OF BROOKLYN, NEW YORK.

GEAR-SHIFT MECHANISM.

Application filed October 19, 1926. Serial No. 142,747.

This invention relates to transmission gearing and has particular reference to gear shift mechanism including the gear shift lever and its connections with the shiftable devices.

Among the objects of the invention is to simplify the lever mechanism for devices of the character stated and particularly with reference to the direction in which the hand lever is operated.

More specifically, whereas in the usual gear shift mechanism the direction of movement of the lever from neutral is always angular, in my improved mechanism the direction of movement is always straight. In other words, from the normal neutral or central position the lever may be moved a short distance and in a direct line for any one of the four usual shifts,—first, second, and third speeds forward, and reverse. Also while in the usual construction the path of movement of the lever is thought of as the letter H, in my construction it is a simple cross, the neutral position of the lever being at the center or intersection of the arms of the cross.

With the foregoing and other objects in view the invention consists in the arrangement and combination of parts hereinafter described and claimed, and while the invention is not restricted to the exact details of construction disclosed or suggested herein, still for the purpose of illustrating a practical embodiment thereof reference is had to the accompanying drawings in which like reference characters designate the same parts in the several views, and in which—

Figure 1 is a left side elevation of my improvement applied to transmission gearing of more or less conventional arrangement.

Fig. 2 is a plan view with parts in section below the plane of the lever swivel.

Fig. 3 is a vertical transverse section on the line 3—3 of Fig. 2, looking forward.

Fig. 4 is a vertical transverse sectional view on the line 4—4 of Fig. 2, looking rearward.

Fig. 5 is a diagram of the outside plan of the lever.

Fig. 6 is a detail perspective view of one of the locking dogs.

Referring now more specifically to the drawings, I show my improvement as applied to a main or motor shaft 10, a transmission shaft 11 in line therewith, and a counter shaft 12. Secured upon the motor shaft is a high speed gear 13 meshing constantly with the gear 14 on the counter shaft which carries also other gears 15 and 16.

Mounted slidably upon the transmission shaft is a collar 17 between which and the direct gear 13 are mating clutch teeth 18 which when the collar is shifted forward couples the motor and transmission shafts together for direct drive. Also slidable upon the transmission shaft is a gear 19 which when shifted rearward and meshed with the gear 15 produces the intermediate speed. Also a gear 20 on the transmission shaft is adapted to be shifted either forward or rearward for the producing of first speed forward when meshed with the gear 16 or for co-operation with the usual intermediate gear mechanism including the gear 21 for the reverse drive. Except for the clutch collar 17 this gear mechanism is mainly conventional and as usual is enclosed in a casing 22 intended to be supplied with lubricant.

Directing now more particular notice to the peculiar and novel mechanism of this invention. I show a hand lever 23 having a ball and socket swivel 23ª in a fixed standard or bracket 25. The upper end or handle of the lever is adapted for free movement forward, rearward, and to the right and left in direct lines from the neutral vertical position, and as usual the lower actuating end 24 of this lever describes paths or directions of movement just reverse to the handle. The diagram of Fig. 5 indicates the direction of movement of the handle of the lever, while indicia on Fig. 2 indicate the corresponding movements of the actuating end of the lever 24.

The position of the collar 17 is determined or controlled by a shifting fork 25ª extending upward therefrom and connected to a fore and aft link through the intervention of a lever 27 shown in Fig. 1. As shown in Fig. 5, for the lever to be shifted forward for third or high speed, the actuator end 24 of the lever will be moved rearward in Fig. 2 and enter the space between the fingers of a knuckle 28 mounted to swing around a fixed vertical pivot 29 and having bell crank connection at 30 with the link 26, causing the rearward movement of the link and the forward movement of the collar 17, and causing the clutch teeth 18 to interlock. As usual to change from one speed or gear condition to another, the lever is always returned to neutral. Consequently the return movement of the lever from the third speed will bring the parts to the position shown in Fig. 2 and cause the separation of the clutch teeth 18.

At the right side of the gear system is a horizontal forwardly and rearwardly movable shaft or bar 31 having a rigid upwardly projected finger 32, this bar carrying a shifting fork 33 controlling the position of the gear 20 on or along the transmission shaft 11.

On the other side of the frame is a bar 34 having a similar upwardly projecting finger 35. When the parts are in neutral position as shown in the drawings, one of the fingers, as 32, is hidden behind the finger 35 as viewed from the side as in Fig. 1. The bar 34 carries a shifting yoke 36 controlling the position or movements of the gear 19.

I do not propose to be limited as regards the precise arrangement or relative location of the slidable bars 31 and 34 and the fingers 32 and 35 as illustrated, reserving the right to employ any variation or equivalent disposition of such or any other mechanical details.

Surrounding the neutral position of the actuating end 24 of the hand lever are other knuckles 37, 38, and 39 mounted to swing around vertical axes 40, 41, and 42, respectively, and each having a pair of spaced fingers to receive the lever end 24.

The gear 20 as above indicated controls both the first speed forward and the reverse, and consequently, from the neutral position of this gear and the finger 32 as shown in Figs. 1 and 2, the bar 31 must be shifted forward for first speed or rearward for reverse. The knuckle 37, therefore, is provided with two spaced arms 44 and 45, the arm 44 being adapted to impinge against the finger 32 and shift the bar 31 forward when the knuckle, acting as a bell crank lever, is swung in a counter clockwise direction around its vertical pivot 40. This movement of the knuckle is effected by a movement of the handle end of the lever to the left as shown in Fig. 5, the actuating end 24 of the lever at such time moving to the right between the fingers of the knuckle 37 and wiping against the lowermost finger shown in Fig. 2, causing the movement of the knuckle as a bell crank by a sort of camming action. When this movement is effected for first speed forward the arm 45 passing ahead of the finger 32 will assume a position corresponding to that shown in Fig. 2 for the arm 44.

The finger 32 is adapted to be actuated also by a Y-shaped lever 46 pivoted at 47 and having a pair of spaced arms 48 and 49. Connected at the other end of the lever at 50 is a link 51 connected to the arm 52 of a bell crank of which the knuckle 38 is a part. For the reverse movement, the actuating end 24 of the hand lever is moved forward in Fig. 2 into co-operation with the fingers of the knuckle 38, moving the knuckle to the left or in a counter clockwise direction, bringing forward the link 51 and swinging the Y-shaped lever 46 to the right and causing the arm 49 of the lever 46 to impinge rearward against the finger 32 to effect a shift of the bar 31 and yoke 33 along with the gear 20 rearward for reverse operation of the gears. When the hand lever is brought again to neutral the arm 48 will bring again the finger 32 to the neutral position of Fig. 2 where it will be limited and held by the arm 45 acting as a positive abutment. In other words, the arms 45 and 48 both serve as abutments limiting respectively the movements of the finger 32 to neutral position as already described.

The knuckle 39 in addition to the two spaced fingers for reception of and actuation by the actuator end 24 of the lever is provided with two spaced arms 53 and 54 adapted to co-operate in succession with the finger 35. For the second gear shift the hand lever is moved to the right in Fig. 5, causing the actuator end 24 of the lever to enter between the lever fingers of the knuckle 39, causing the knuckle to swing around its axis 42 toward the left and causing the arm 53 to strike against the finger 35 and move it and the bar 34 and gear 19 rearward. When the lever is shifted again to neutral the arm 54 will restore the finger 35 to neutral position. It will thus be seen that the hand lever from neutral position to its actuating position for any purpose is always given a simple shift in a straight line and thence returned again in a straight line to neutral position.

As a further safeguard against the accidental or unintended shifting of any of the parts or oscillation of the knuckles, the lever mouth of each knuckle is guarded by a tilting dog 55, the upper end 56 of which is held upright above its pivot 57 by means of a weighted lower end 58. The axis of the pivot 57 is transverse to the opening or mouth of the knuckle in each case, whereby the dog constitutes a positive stop or abutment preventing the accidental rotation of the knuckle. The end 56, however, of the dog is impinged directly by the lower end 24 of the lever when it is swung into engagement with the knuckle whereby the dog is tilted around its axis and held in tilted position by the knuckle until the knuckle is returned to normal position and the lever is withdrawn therefrom, when the gravity end 58 of the dog restores it to normal locking or holding position. As a means to compel the actuator end 24 of the lever to move always along an arm of a rectangular cross and thereby effect the proper actuation of the knuckles, I form a cross shaped guide 59 in a horizontal wall 60 just beneath the pedestal 25. The dogs are pivoted on suitable brackets 61 of a support 62 of any desired nature mounted within the casing 22.

I claim:

1. In gear shift mechanism, the combination of a lever having a fixed fulcrum, a plurality of knuckles mounted to swing around axes approximately parallel to the axis of the lever, each knuckle having a pair of spaced fingers between which the lever is adapted to be received for causing the knuckle to swing around its axis, and means to hold the idle knuckles from accidental movement.

2. Mechanism as set forth in claim 1 in which the shifting mechanism includes a shiftable member and a yoke arm, and at least one of the knuckles is provided with a pair of spaced arms adapted to engage and actuate said yoke arm successively when the lever is moved from and returned to neutral position.

3. Mechanism as set forth in claim 1 in which there is provided a shifting member including a yoke arm and two of the knuckles are provided with spaced arm connections with said yoke arm whereby when the lever is moved in either of two directions from neutral one arm of each pair will cause the shifting of the member, while the other arm of the same pair will cause the return of the member to neutral position.

4. Mechanism as set forth in claim 1 including a shifting member and in which two of the knuckles are provided each with two spaced arm connections adapted to co-operate successively with the shifting member, while one of the arms of the other pair acts as a limiting stop for the member when returned to neutral position.

5. In gear shift lever mechanism, the combination of a lever adapted to oscillate about its fulcrum connection, a plurality of knuckles each having a pair of spaced fingers providing an open mouth for reception of and actuation by the lever when caused to enter therein, and an automatic dog co-operating with the other knuckle holding the same from accidental movement when the first mentioned knuckle is moved by the lever.

6. Mechanism as set forth in the preceding claim in which the automatic dog in connection with each knuckle is moved out of holding position by the advent of the operating lever.

7. Gear shift mechanism as set forth in claim 1 including a pair of independent shafts, means to couple the shafts together for direct drive one from the other, and connections between the lever and the coupling means including a pivoted fork and connections between said fork and one of said knuckles for actuating the coupling means, substantially as set forth.

In testimony whereof I affix my signature.

ERNEST P. LORCH.